(12) United States Patent
Palluck et al.

(10) Patent No.: US 10,184,512 B2
(45) Date of Patent: Jan. 22, 2019

(54) ELASTOMERIC JOURNAL BEARING

(71) Applicant: BOGE ELASTMETALL GMBH, Damme (DE)

(72) Inventors: Karl-Walter Palluck, Damme (DE); Andreas Vossel, Osnabrueck (DE)

(73) Assignee: BOGE ELASTMETALL GMBH, Damme (DE)

( * ) Notice: Subject to any disclaimer, the term of this patent is extended or adjusted under 35 U.S.C. 154(b) by 0 days.

(21) Appl. No.: 15/568,747

(22) PCT Filed: May 30, 2016

(86) PCT No.: PCT/EP2016/062130
§ 371 (c)(1),
(2) Date: Oct. 23, 2017

(87) PCT Pub. No.: WO2016/193201
PCT Pub. Date: Dec. 8, 2016

(65) Prior Publication Data
US 2018/0087567 A1    Mar. 29, 2018

(30) Foreign Application Priority Data

Jun. 4, 2015 (DE) .......................... 10 2015 108 879

(51) Int. Cl.
*F16C 17/03* (2006.01)
*F16C 33/20* (2006.01)
(Continued)

(52) U.S. Cl.
CPC ............ *F16C 17/035* (2013.01); *F16C 33/20* (2013.01); *F16C 33/64* (2013.01); *F16C 33/664* (2013.01);
(Continued)

(58) Field of Classification Search
CPC ........ F16C 17/035; F16C 13/02; F16C 13/14; F16C 33/664; F16C 2226/74;
(Continued)

(56) References Cited

U.S. PATENT DOCUMENTS

| 3,642,268 A | 2/1972 | Hipsher |
| 4,861,004 A * | 8/1989 | Yokota ................ F16F 13/1409 |
| | | 267/140.12 |

(Continued)

FOREIGN PATENT DOCUMENTS

| DE | 1942853 A | 3/1970 |
| DE | 3831644 A1 | 3/1990 |

(Continued)

*Primary Examiner* — Marcus Charles
(74) *Attorney, Agent, or Firm* — Cohen & Hildebrand, PLLC

(57) ABSTRACT

An elastomeric journal bearing, comprising inner part (2) extending in axial direction (x), outer sleeve (3) surrounding inner part (2), elastomeric bearing body (4) arranged between inner part (2), outer sleeve (3), connected to inner part (2), said bearing body comprising at least two radially extending webs (5, 6) which are offset in circumferential direction (u), and two annular walls (7, 8) which are offset in axial direction (x), between which extend axially webs (5, 6), and at least two chambers (10, 11) filled with liquid (9) and are separated from each other in circumferential direction (u) by webs (5, 6), said chambers being fluidically connected via at least one channel (12). The axial ends (36, 37, 38, 39) of the webs (5, 6) have at least in the region of the radially outer web ends (22, 23) axial end faces (40, 41, 42, 43) which bear against the walls (7, 8).

11 Claims, 8 Drawing Sheets

(51) Int. Cl.
*F16C 33/64* (2006.01)
*F16C 33/66* (2006.01)
*F16C 13/02* (2006.01)
*F16F 13/14* (2006.01)
*F16F 9/32* (2006.01)

(52) U.S. Cl.
CPC .......... *F16F 13/14* (2013.01); *F16C 2226/74* (2013.01); *F16F 9/3278* (2013.01); *F16F 13/1472* (2013.01)

(58) Field of Classification Search
CPC .. F16C 32/0629; F16C 32/0644; F16C 33/64; F16F 13/14; F16F 13/1418; F16F 13/1472; F16F 9/3278; F16J 13/1472; F16J 9/3278
USPC .................. 384/99, 215–216, 276, 306, 316; 267/64.11, 140.12–14.13, 292, 267/140.12–140.13
See application file for complete search history.

(56) References Cited

U.S. PATENT DOCUMENTS

| | | | | |
|---|---|---|---|---|
| 5,013,012 A | * | 5/1991 | Jouade | F16F 13/1463 267/140.12 |
| 6,527,261 B2 | * | 3/2003 | Breitfeld | F16F 1/3863 267/140.12 |
| 6,561,501 B2 | * | 5/2003 | Bouhier | F16F 13/1418 267/140.12 |
| 6,622,996 B2 | * | 9/2003 | Mayerbock | B60G 7/02 267/140.11 |
| 6,644,635 B2 | * | 11/2003 | Breitfeld | F16F 13/16 267/140.12 |
| 6,719,280 B2 | * | 4/2004 | Takashima | F16F 13/101 267/140.13 |
| 7,198,256 B2 | * | 4/2007 | Tatura | F16F 1/387 267/140.12 |
| 7,866,639 B2 | * | 1/2011 | Endo | F16F 13/14 267/140.12 |
| 8,128,075 B2 | * | 3/2012 | Kato | F16F 13/1427 267/140.12 |
| 9,528,566 B2 | * | 12/2016 | Schnaars | F16F 13/16 |
| 2006/0119025 A1 | | 6/2006 | Kato | |
| 2011/0188790 A1 | * | 8/2011 | Eschweiler | F16F 13/14 384/99 |

FOREIGN PATENT DOCUMENTS

| | | | | |
|---|---|---|---|---|
| DE | 4438931 A1 | * | 5/1996 | ............. F16F 13/14 |
| DE | 69601272 T2 | | 8/1996 | |
| DE | 10315645 A1 | * | 10/2004 | ............. F16C 27/06 |
| DE | 10351229 A1 | | 6/2005 | |
| DE | 102007022410 A1 | * | 11/2008 | ......... F16F 13/1481 |
| EP | 0389839 A2 | | 10/1990 | |
| EP | 1908988 A1 | * | 4/2008 | ........... F16F 1/3842 |
| WO | WO 9800654 A1 | * | 1/1998 | ......... F16F 13/1463 |
| WO | 2006061874 A | | 6/2006 | |
| WO | WO 2017129635 A1 | * | 8/2017 | ............. F16F 13/14 |

\* cited by examiner

ELASTOMERIC JOURNAL BEARING

This is an application filed under 35 USC § 371 of PCT/EP2016/062130, filed on May 30, 2016 claiming priority to DE 10 2015 108 879.7 filed on Jun. 4, 2015, each of which is herein incorporated by reference in its entirety.

BACKGROUND OF THE INVENTION

The invention relates to an elastomeric journal bearing having an inner part extending in an axial direction, an outer sleeve surrounding the inner part, and an elastomeric bearing body which is arranged between the inner part and the outer sleeve and is connected to the inner part, the bearing body having at least two radially extending webs which are offset relative to one another in the circumferential direction, and two annular walls which are offset relative to one another in the axial direction, with the webs extending axially between the annular walls, and at least two chambers which are filled with a liquid and which are separated from one another in the circumferential direction by the webs, with the chambers being fluidically connected to each other by at least one channel. The invention further relates to a method for producing an elastomeric journal bearing.

BRIEF SUMMARY OF THE INVENTION

Elastomeric journal bearings of the aforementioned type generally have a cage that is vulcanized into the bearing body, with the webs terminating at the cage. Additionally, an overflow lip is vulcanized onto the outside of the cage. For mounting the journal bearing, the outer sleeve is pushed over the bearing body while immersed in the liquid and thereafter calibrated, by reducing the diameter, to improve sealing.

Disadvantageously, however, the webs can be radially tensioned only in the assembled state. Furthermore, the calibration is limited to a small dimensional change. In addition, the calibration causes the internal pressure to increase and thus significantly reduces the service life. The increased internal pressure also causes an increase in the dynamical stiffness. Furthermore, the webs which are axially and radially materially connected to the bearing body can be torn off or tear when subjected to high loads, which may cause a complete failure of the journal bearing.

Starting from this observation, it is the object of the invention to reduce the risk that the webs are torn off or tear.

The elastomeric journal bearing according to the invention has an inner part extending in an axial direction, an outer sleeve surrounding the inner part, and an elastomeric bearing body arranged between the inner part and the outer sleeve and connected to the inner part, with the elastomeric bearing body having two or at least two radially extending webs which are offset relative to one another in the circumferential direction and two annular walls which are offset relative to one another in the axial direction and between which the webs axially extend, and at least two chambers which are filled with a liquid and are separated from each other in the circumferential direction by the webs, wherein the chambers are fluidically connected via at least one channel, wherein the axial ends of the webs have at least in the region of the radially outer web ends axial end faces which bear against the walls, in particular axially.

The webs bear against the walls in the axial direction exclusively in or at least in the region of their radially outer webs. The webs are thus more resilient and/or more flexible compared to conventional journal bearings. In particular, the webs can follow larger movements of the bearing body, thus reducing the risk of the bearing body and/or of the webs to be torn off or tear. In this way, a considerable increase in the service life of the journal bearing is attained. Furthermore, for example, soft dynamic hardening of the journal bearing can be achieved with the resilience of the webs. In the preassembled state of the journal bearing, the webs have preferably an axial gap with respect to the walls in or at least in the region of their radially outer web ends and/or with their axial end faces, which is closed the during assembly of the journal bearing, in particular by applying axial pressure to the bearing body.

The term radial and/or radial direction is in particular to be understood as one or any direction which is transverse to the axial direction. The term circumferential direction is in particular to be understood as one or any direction which extends around the axial direction.

The axial end faces of the webs form, in particular, free end faces. Preferably, the webs are not materially connected to the walls at or with their axial ends at or at least in the region of the radially outer web ends and/or at or with their axial end faces. In particular, the webs do not materially transition into the walls at or with their axial ends at or at least in the region of the radially outer web ends and/or with their axial end faces. Preferably, the webs movably bear against the walls with their axial ends at or at least in the region of the radially outer web ends and/or with their axial end faces. Preferably, the webs are movable or capable of moving relative to the walls at or at least in the region of the radially outer web ends and/or with their axial end faces at or at least in the region of the radially outer web ends and/or their axial ends. Although the mobility of the radially outer web ends relative to the walls may be limites, for example due to friction between the axial end faces of the webs and the walls, the mobility of the radially outer web ends relative to the walls is enhanced in comparison to journal bearings where the axial ends of the webs are materially connected to the walls in the region of the radially outer web ends. Advantageously, the webs are only radially inwardly materially connected to the bearing body and/or to the inner part at or at least in the region of the radially outer web ends.

Preferably, the axial end faces of the webs enclose axial gaps with the walls, in particular before the journal bearing is assembled, with the axial gaps being closed by applying axial pressure to the elastomeric bearing body, in particular after assembly of the journal bearing. The axial end faces of the webs thus bear against, in particular, the walls.

In particular, the webs are not connected directly and/or material-homogeneously and/or materially to one another on their radially outer webs. Preferably, the elastomeric bearing body has no rigid body, such as a cage, which is materially connected to the radially outer web ends and completely surrounds the inner part. According to one embodiment, the webs have on their radially outer web ends radial end faces and/or in each case one radial end face. The radial end faces of the webs preferably form free end faces.

Preferably, the webs bear with their radially outer web ends and/or with their radial end faces, in particular radially, against the outer sleeve and/or against the inner circumference of the outer sleeve. Preferably, the webs are not materially connected to the outer sleeve at or with their radially outer web ends and/or at or with their radial end faces. Preferably, the webs bear movably against the outer sleeve with their radially outer web ends and/or with their radial end faces. Preferably, the webs are movable or configured to be movable relative to the outer sleeve at or at least in the region of the radially outer web ends and/or with their radial end faces. Although the mobility of the radially outer web ends relative to the outer sleeve may be limited, for example due to friction between the radially outer web ends and the outer sleeve, the radially outer web ends have in particular still a greater mobility relative to the outer sleeve in comparison to journal bearings where the webs are materially connected with their radially outer web ends to the outer sleeve.

According to a further embodiment, a carrier element which in particular surrounds the bearing body is arranged between the bearing body and the outer sleeve. Preferably, the carrier element completely surrounds the bearing body. Preferably, the webs bear against the carrier element and/or the inner circumference of the carrier element with their radially outer webs and/or with their radial end faces, in particular radially. Preferably, the webs are not materially connected to the carrier element at or with their radially outer web ends and/or at or with their radial end faces. Preferably, the webs bear movably against the carrier element with their radially outer web ends and/or with their radial end faces. Preferably, the webs are movable or configured for movement relative to the carrier element at or at least in the region of the radially outer web ends and/or with their radial end faces. The mobility of the radially outer web ends relative to the carrier element may be limited, for example, due to friction and/or by an interference fit between the radially outer web ends and the carrier element. In particular, however, the radially outer web ends have greater mobility relative to the carrier element in comparison to journal bearings where the webs are materially connected with their radially outer web ends to the carrier element.

The axial length of the carrier element is preferably shorter than the axial length of the elastomeric bearing body. In particular, the carrier element is arranged in the axial direction between the walls. Preferably, the carrier element abuts bears against the walls with its axial ends, in particular axially.

Preferably, the chambers are delimited radially outwardly and/or in the radial direction, in particular outwardly, by the carrier element and/or by the outer sleeve. Preferably, the chambers are delimited radially inwardly by the elastomeric bearing body and/or by the inner part. Furthermore, the chambers are preferably delimited in the axial direction by the walls. In particular, the walls abut the outer sleeve in a liquid-tight manner. This prevents liquid from leaking from the journal bearing.

The carrier element can perform several tasks. In particular, the channel is provided in the carrier element. In this case, the carrier element forms a channel support. For example, the channel is designed in the form of a groove introduced into the outer circumference of the carrier element, wherein the groove is connected to the chambers in particular by discharge holes or discharge openings provided in the carrier element. The channel is preferably delimited radially outwardly and/or in the radial direction, in particular outwardly, by the outer sleeve. Preferably, the channel is delimited radially inwardly and/or laterally by the carrier element. In addition or alternatively, however, the carrier element may also be used to radially prestress the bearing body during assembly. Specifically, the elastomeric bearing body is radially pre-stressed by the carrier element. The carrier element is composed, for example, of several interconnected partial shells. In particular, the carrier element is composed of two half-shells, which preferably form the partial shells. The partial shells or half shells are connected with one another, for example, by one or more connecting elements and/or by a snap connection.

According to one embodiment, the webs are with their radially outer web ends positively connected to the carrier element, in particular in the circumferential direction. Preferably, recesses are provided on the inner circumference of the carrier element, in which the webs engage with their radially outer web ends, preferably movably and/or non-fixed. The carrier element thus serves in particular to support the radially outer web ends, preferably in the circumferential direction. Mobility of the radially outer web ends relative to the carrier element is thus limited to particular to tilting, pivoting and/or twisting in the recesses. The recesses are preferably continuous axially and/or in the axial direction. The radially outer web ends can thus abut the walls with their axial end faces. For example, the recesses are substantially rectangular.

Preferably, the radially outer web ends can be tilted and/or pivoted and/or twisted relative to the walls. Preferably, the radially outer web ends can be tilted and/or pivoted and/or twisted relative to the outer sleeve. Advantageously, the radially outer web ends can be tilted and/or pivoted and/or twisted, in particular in the recesses, relative to the carrier element.

According to one embodiment, at least one of the radially outer web ends and/or at least one of the radial end faces of the webs and/or at least one of the webs has at its radially outer web end one overflow lip and/or at least one of the webs has at or on its radial end face at least one overflow lip. Preferably, the at least one overflow lip and/or the web having the at least one overflow lip bears with the at least one overflow lip, preferably radially, against the outer sleeve or against the carrier element, in particular against the inner circumference of the outer sleeve or of the carrier element. Advantageously, the at least one overflow lip is arranged in an overflow area, which is in particular connected to both chambers and/or transitions into each of the chambers. Preferably, the at least one overflow lip separates the chambers from one another, preferably in the overflow region, in particular when the or a pressure difference between the chambers is below a predetermined pressure difference. Preferably, the at least one overflow lip may open at least one additional liquid-conducting connection between the chambers when a predetermined pressure difference between the chambers has been reached or exceeded, especially in the overflow region. By opening the at least one additional liquid-conducting connection, liquid can be exchanged between the chambers not only through the channel, but additionally by way of the at least one additional liquid-conducting connection. This can prevent damage to the journal bearing if the pressure difference between the chambers is excessively high and the channel does not permit the liquid to be exchanged with the required volume flow due to its flow resistance. The at least one overflow lip preferably forms one or at least one overpressure valve.

According to one embodiment, the at least one overflow lip extends in the radial direction through an opening provided in the carrier element. The opening is in particular provided in one of the recesses, preferably in the recess associated with the web that has the at least one overflow lip. Preferably, the opening is continuous in the radial direction and/or the opening extends in the radial direction through the carrier element. The opening is preferably connected to both chambers and/or preferably transitions into each of the chambers. Preferably, the chambers are separated from one another in the opening by the at least one overflow lip, in particular when the pressure difference between the chambers is less than the or less than a predetermined pressure difference. In particular, the opening forms the overflow region and/or the overflow region is particularly provided in the opening.

The at least one overflow lip may extend in the radial direction. Preferably, however, the at least one overflow lip is inclined relative to the radial direction and/or the at least one overflow lip is inclined relative to the circumferential direction, in particular outwardly. Due to the inclination of the at least one overflow lip, a preferred flow direction and/or a one-way function can be realized. In particular, the at least one overflow lip is a one-way overpressure valve. Preferably, the at least one overflow lip is located in a plane extending in the axial direction and/or parallel to the axial direction, which is inclined in particular relative to the radial direction.

Preferably, the web having the at least one overflow lip has, in particular at its radially outer web end and/or at its radial end face, two or more overflow lips, which are preferably arranged next to one another in the axial direction. Preferably, the overflow lips are inclined relative to one another in opposite directions. Alternatively, the overflow lips may be inclined in identical directions. Possible is also a combination of a radially extending overflow lip and an inclined overflow lip. Preferably, the overflow lips each lie in a plane extending in the axial direction and/or parallel to the axial direction, which is inclined in particular in the radial direction.

According to another embodiment, the radially outer web ends and/or the radial end faces of the webs have overflow lips and/or the webs have overflow lips at their radially outer web ends and/or at or on their radial end faces. Preferably, the radially outer web ends and/or the radial end faces of the webs have each one, at least one, two or several overflow lips and/or the webs have each one, at least one, two or several overflow lips at their radially outer web ends and/or at or on their radial end faces. Preferably, the overflow lips and/or the webs with the overflow lips preferably bear radially against the outer sleeve or the carrier element, in particular against the inner circumference of the outer sleeve or of the carrier element. Advantageously, the overflow lips are arranged in overflow regions which are in particular each connected to both chambers and/or which each transition into the respective chambers. Preferably, the overflow lips separate the chambers from one another, preferably in the overflow regions, in particular when the pressure difference or a pressure difference between the chambers is less than a predetermined pressure difference. Preferably, the overflow lips or at least one of the overflow lips can open at least one additional liquid-conducting connection between the chambers in particular in at least one of the overflow regions when the pressure difference or a predetermined pressure difference between the chambers has been reached or exceeded. By opening the at least one additional liquid-conducting connection, liquid can be exchanged between the chambers not only through the channel, but additionally by way of the at least one additional liquid-conducting connection. Each overflow lip preferably forms an overpressure valve. Preferably, each web has, in particular at its radially outer web end and/or on its radial end face, one, at least one, two or several of the overflow lips.

According to one embodiment, the overflow lips extend in the radial direction through openings provided in the carrier element. The openings are, in particular, arranged in the recesses. Preferably, the openings are continuous in the radial direction and/or the openings extend through the carrier element in the radial direction. Each of the openings is preferably connected to both chambers and/or preferably transitions into each of the chambers. Preferably, the chambers are separated from one another in the openings by the overflow lips, in particular when the pressure difference between the chambers is less than the pressure difference or a predetermined pressure difference. The openings form in particular the overflow regions and/or the overflow regions are provided, in particular, in the openings.

The overflow lips may extend in the radial direction. Preferably, the overflow lips are inclined relative to the radial direction and/or the overflow lips are inclined relative to the circumferential direction, in particular outwardly. A combination of radially extending and inclined overflow lips is also possible. Preferably, the webs have, in particular on their radially outer web ends and/or on their radial end faces, in each case two mutually oppositely inclined overflow lips, which are arranged preferably next to one another in the axial direction. Alternatively, the webs may each have, in particular on their radially outer web ends and/or on their radial end faces, two identically inclined overflow lips, which are preferably arranged next to one another in the axial direction. Due to the inclination of the overflow lips, a preferred flow direction and/or a one-way function can be realized. In particular, each inclined overflow lip forms a one-way overpressure valve.

Preferably, the overflow lips each lie in a plane extending in the axial direction and/or in a plane extending parallel to the axial direction, which is inclined in particular in relation to the radial direction.

Preferably, the at least one overflow lip or the overflow lips is/are composed of an elastomeric material such as rubber. In particular, the at least one overflow lip or the overflow lips is/are formed by the material of the elastomeric bearing body.

Preferably, each overflow lip or the at least one overflow lip has in particular two axial lip ends which preferably face one another in the axial direction. According to one embodiment, each or the at least one overflow lip is preferably connected to the respective web or to the web which has the at least one overflow lip over its entire extent at a first of the axial lip ends in a plane extending transversely to the axial direction and at a second of the axial lip ends only over part of its extent in the or a plane extending transversely to the axial direction, in particular materially and/or by way of vulcanization. Preferably, the radially outer end region of each or of the at least one overflow lip is free at the second axial lip end and/or is not connected to the respective web or to the web having the at least one overflow lip. Between the two axial lip ends, each or the at least one overflow lip is preferably free and/or is connected only with its radially inner end to the respective web or to the web having the at least one overflow lip, in particular materially and/or by way of vulcanization. This embodiment enables each or the at least one overflow lip to open obliquely to the axial direction and/or diagonally when the predetermined pressure difference has been reached or exceeded. In this way, higher dynamic softness of the journal bearing can be achieved, since the overflow lips can open a larger cross section than conventional overflow lips. When two, in particular, mutually oppositely inclined overflow lips are arranged next to one another in the axial direction, the first axial ends of these two overflow lips, for example, adjoin each other, and/or the first axial ends of these two overflow lips preferably transition into each other and/or in particular coincide.

The carrier element preferably has axial contact surfaces against which the overflow lips or the at least one overflow lip bear with their axial lip ends and/or with their second axial lip ends, in particular axially. The axial contact surfaces preferably form axial edges of the opening or openings provided in the carrier element. In particular, each or the at least one overflow lip is inclined at its axial lip ends and/or at its second axial lip end, preferably on the face side, against a plane extending transversely to the axial direction. Furthermore, each axial contact surface of the carrier element is preferably inclined relative to the plane or relative to a plane extending transversely to the axial direction. Each axial contact surface and the respective, in particular second, axial lip end bearing against the contact surface are preferably identically and/or similarly inclined. In this way, a high leak-tightness can be achieved even at low pressures. If two of the overflow lips are arranged next to one another in the axial direction, then their second axial lip ends are, in particular at their end faces, preferably inclined toward one another with increasing radial distance from the inner part.

According to a further embodiment, the radially outer web ends of the webs are each shaped as a plate. In particular, the plane of the plate of each radially outer web extends both in the axial direction and in the circumferential direction. For example, each radially outer web end is substantially rectangular. Preferably, each radially outer web end protrudes at least on one side or on both sides from the respective web in the circumferential direction.

According to one embodiment, the radially outer web ends each have an, in particular separate, reinforcing member which preferably forms a rigid body. Preferably, each of the reinforcing members is or forms a reinforcing plate. In particular, the plane of each reinforcing plate extends both in the axial direction and in the circumferential direction. For example, the reinforcing members are essentially rectangular. Advantageously, the reinforcing members are spaced from each other in the circumferential direction and/or are not directly and/or uniformly connected to one another. Preferably, each reinforcing member is embedded in the bearing body and/or in the respective web and/or in the respective radially outer web end, in particular vulcanized. Alternatively, each reinforcing member, for example, is applied to the respective radially outer web. In this case, the overflow lips are arranged, for example, on the reinforcing members, in particular vulcanized thereto. Preferably, each reinforcing member is materially connected to the respective web, preferably by way of vulcanization. The reinforcing members are composed, in particular, of plastic and/or of metal.

According to a further embodiment, the walls each have a respective annular reinforcing member which preferably forms a rigid body. Preferably, each reinforcing member is embedded in the bearing body and/or in the respective wall, in particular vulcanized. Alternatively, each reinforcing member is applied, for example, to an axial end face of the respective wall. Preferably, each reinforcing member is materially connected to the respective wall, preferably by vulcanization. The reinforcing members are in particular composed of plastic and/or metal. The reinforcing members preferably have an axial spacing between one another, in which in particular the webs are arranged.

The inner part preferably forms a rigid body. In particular, a continuous mounting hole extends through the inner part in the axial direction. The inner part is preferably composed of plastic and/or of metal. The inner part preferably includes an inner metal body which is surrounded by a plastic body, to which the elastomeric bearing body is connected, preferably materially. In this case, the mounting hole extends in particular through the inner metal body. Furthermore, the plastic body is preferably rigidly, in particular materially connected with the metal body.

The bearing body is preferably composed of an elastomeric material, in particular rubber. Advantageously, the reinforcing members and/or the reinforcing elements are embedded in the bearing body, in particular vulcanized. Preferably, the bearing body surrounds the inner part. Preferably, the bearing body is rigidly connected to the inner part, in particular firmly adhering and/or materially connected. In particular, the bearing body is under axial and/or radial prestress.

The carrier element preferably forms a rigid body. The carrier element is preferably composed of plastic and/or metal.

The outer sleeve preferably forms a rigid body. In particular, the outer sleeve is cylindrical or substantially cylindrical. Preferably, the outer sleeve surrounds the bearing body and/or the carrier element. Preferably, the outer sleeve is made of plastic and/or of metal. In particular, the bearing body is axially and/or radially pre-stressed by the outer sleeve.

According to one embodiment, the outer sleeve has two axially spaced axial stops, which extend radially inwardly, in particular from the inner circumference of the outer sleeve. The elastomeric bearing body is preferably arranged in the axial direction between the axial stops. The elastomeric bearing body is advantageously axially secured in the outer sleeve by the axial stops. Preferably, the elastomeric bearing body axially bears with its walls against the axial stops, in particular in the axial direction. Preferably, the elastomeric bearing body is subjected to an axial pre-stress by the axial stops. For example, the axial stops are formed by axial end portions of the outer sleeve which are in particular folded radially inwardly and/or flanged.

The invention further relates to a method for producing the or an elastomeric journal bearing according to the invention, wherein the elastomeric bearing body is produced and/or provided and connected to the inner part, whereafter the elastomeric bearing body connected with the inner part, in particular in the axial direction and/or preferably under application of an axial pressure, is inserted into the outer sleeve while immersed in a liquid and subsequently affixed in the outer sleeve. The elastomeric bearing body is thereby produced in particular in such a way that the axial end faces of the webs enclose axial gaps with the walls. Furthermore, the elastomeric bearing body, which is connected to the inner part, is inserted into the outer sleeve in particular by applying axial pressure to the elastomeric bearing body such that the axial gaps are closed and the axial end faces of the webs are placed in contact with the walls. The inner part is in particular produced and/or provided, preferably before the bearing body is produced. Preferably, the outer sleeve is also produced and/or provided.

The inventive method can be developed further according to all embodiments described in conjunction with the inventive journal bearing. Furthermore, the journal bearing according to the invention can be developed further in accordance with all embodiments described in conjunction with the method according to the invention.

According to one embodiment, the elastomeric bearing body is produced by recasting or extrusion-coating the inner part with an elastomeric material such as rubber. Preferably, the elastomeric bearing body is connected with the inner part already during its manufacture. Alternatively, the elastomeric bearing body is connected to the inner part after its manufacture. The liquid or part of the liquid under which the elastomeric bearing body connected with the inner part is inserted, forms in particular the liquid, with which the chambers are filled, after the elastomeric bearing body has been affixed in the outer sleeve.

Preferably, a carrier element or the carrier element is prepared and/or provided. In particular, the carrier element is assembled from several partial shells or from two half shells, which are preferably connected together by a snap connection. The partial shells or half-shells are preferably produced and/or provided.

According to a further development, the carrier element is mounted on the elastomeric bearing body, in particular before the elastomeric bearing body connected to the inner part is inserted into the outer sleeve, in such a way that the elastomeric bearing body is surrounded by the carrier element and is placed under radial prestress. This has the particular advantage that no work needs to be expended against the nearly incompressible liquid when the bearing body is radially stressed. After the carrier element is mounted on the elastomeric bearing body, the elastomeric bearing body connected to the inner part is inserted into the outer sleeve together with the carrier element surrounding the elastomeric bearing body, so that the carrier element is in particular arranged between the elastomeric bearing body and the outer sleeve.

According to one embodiment, the outer sleeve has a first axial stop which extends in particular radially inwardly from the inner periphery of the outer sleeve, before the elastomeric bearing body is inserted into the outer sleeve. The first axial stop is formed for example by a first axial end portion of the outer sleeve, which is in particular folded radially inwardly and/or flanged. When the elastomeric bearing body is inserted into the outer sleeve, the elastomeric bearing body is brought into contact with the first axial stop, in particular in the axial direction. The elastomeric bearing body is then preferably affixed in the outer sleeve by providing the outer sleeve with a second axial stop disposed at an axial distance to the first axial stop which extends radially inwardly, in particular starting from the inner circumference of the outer sleeve, so that the elastomeric bearing body is positively clamped between the two axial stops in the axial direction, preferably positively, in particular while maintaining the axial tension. The second axial stop is preferably formed by a second axial end portion of the outer sleeve, which is in particular folded radially inwardly and/or flanged. The first and second axial stops form in particular axial stops described in conjunction with the journal bearing according to the invention.

According to a further embodiment, the outer sleeve is reduced in diameter (calibrated), in particular after the elastomeric bearing body is affixed in the outer sleeve. In this way, the radial and/or axial prestress of the elastomeric bearing body can further increased.

BRIEF DESCRIPTION OF THE DRAWINGS

The invention will now be described hereinafter with reference to a preferred embodiment with reference to the drawing. The drawing shows in.

DETAILED DESCRIPTION OF THE INVENTION

Figure 1:
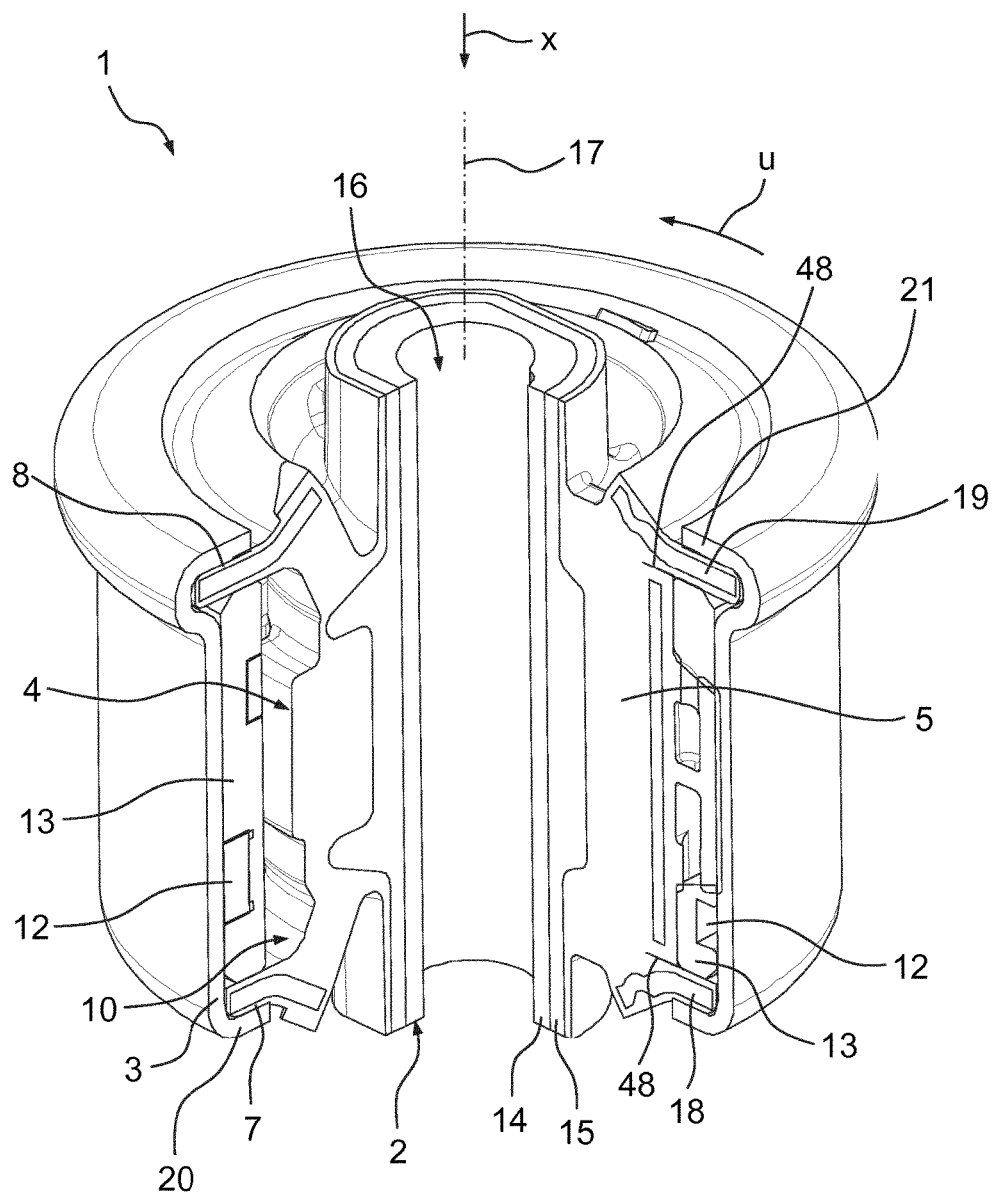
FIG. 1 a perspective and partially cutaway view of an elastomeric journal bearing according to one embodiment, FIG. 2 a plan view of the journal bearing, FIG. 3 a longitudinal section through the journal bearing along the section line III-III shown in FIG. 2, FIG. 4 a longitudinal section through the journal bearing along the section line IV-IV shown in FIG. 2, FIG. 5 a cross section through the journal bearing along the section line V-V shown in FIG. 4, FIG. 6 a cross section through the journal bearing along the section line VI-VI shown in FIG. 4, FIG. 7 a longitudinal section through the elastomeric bearing body of the journal bearing prior to its installation in the outer sleeve, and FIG. 8 an exploded view of the journal bearing.
Figure 2:
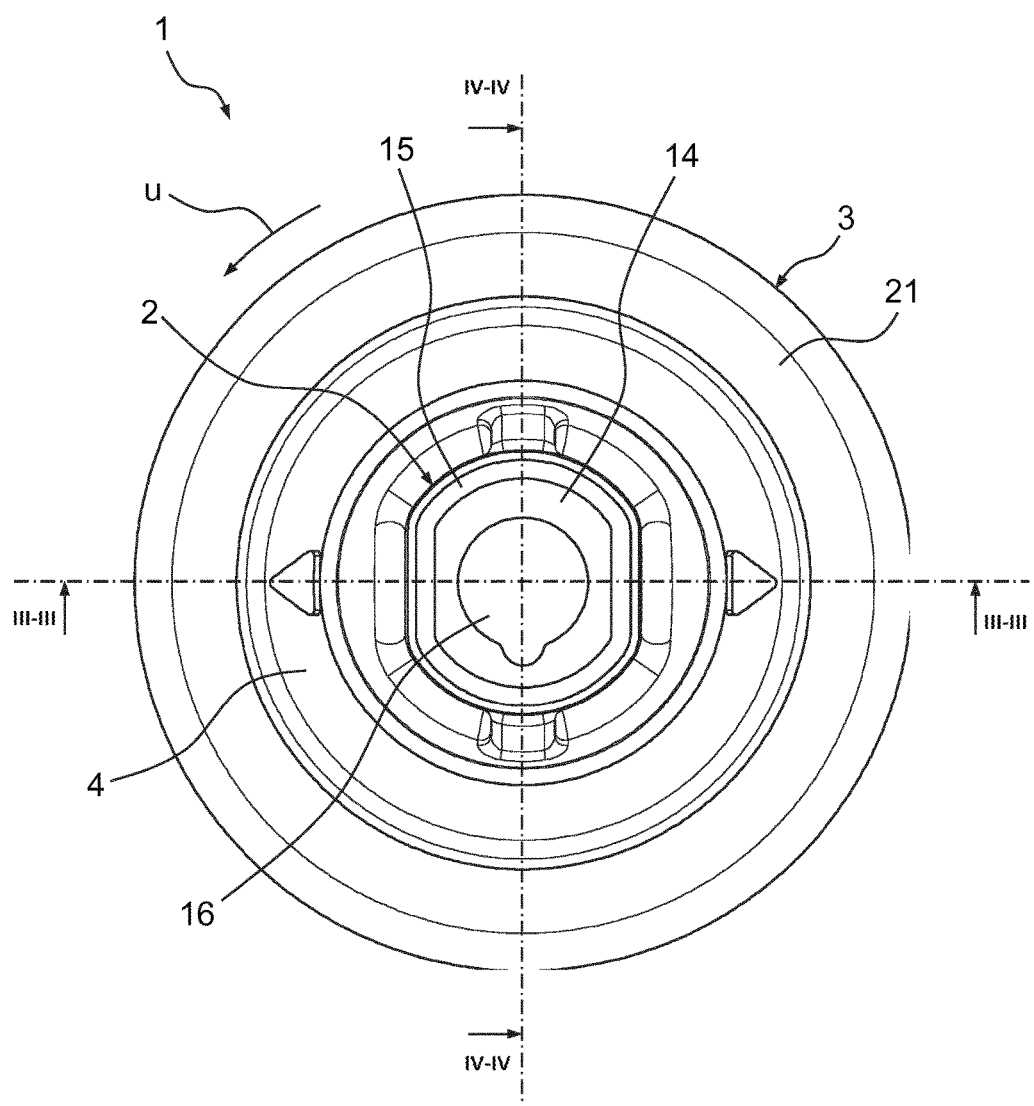
Figure 3:
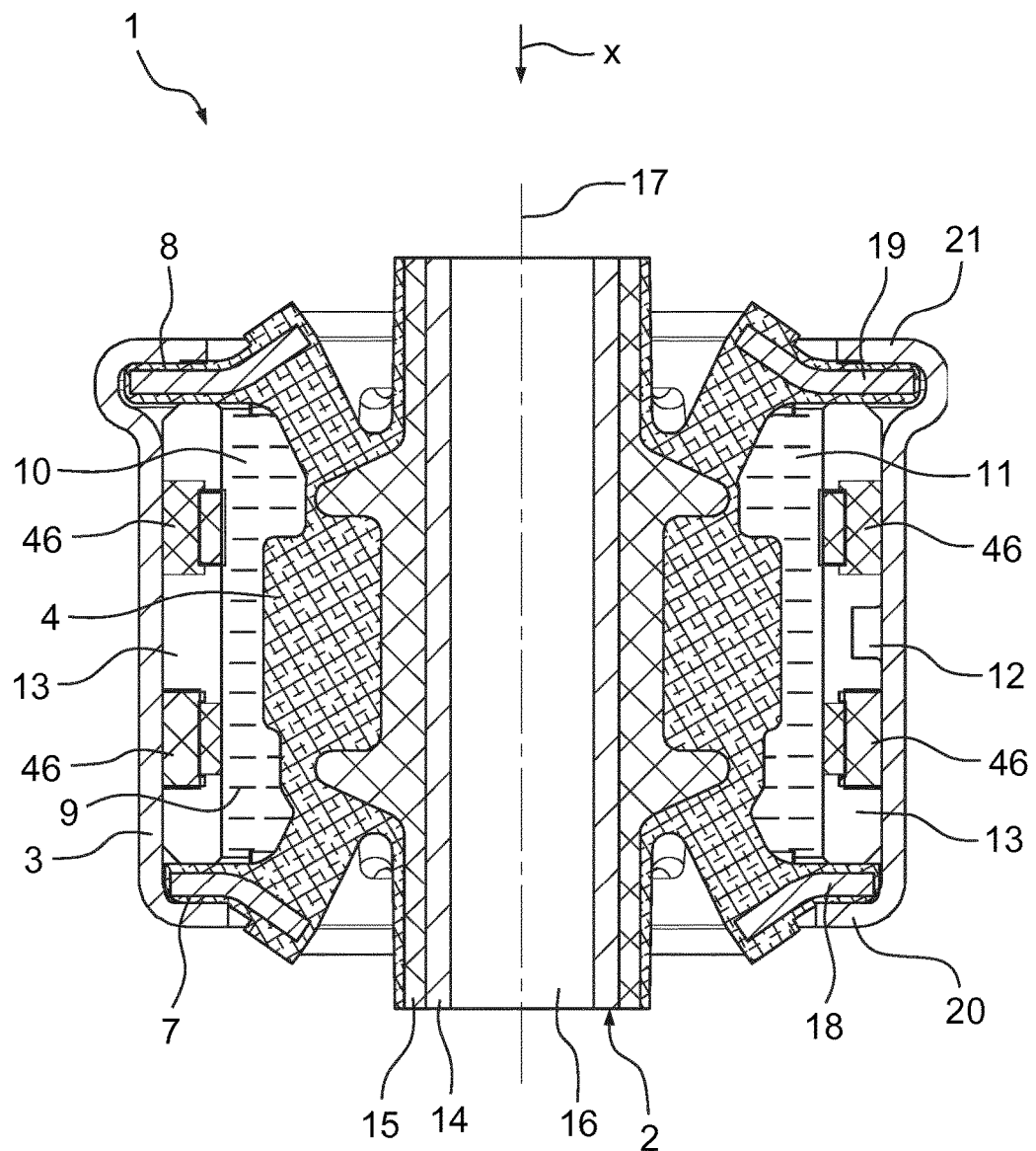
Figure 4:
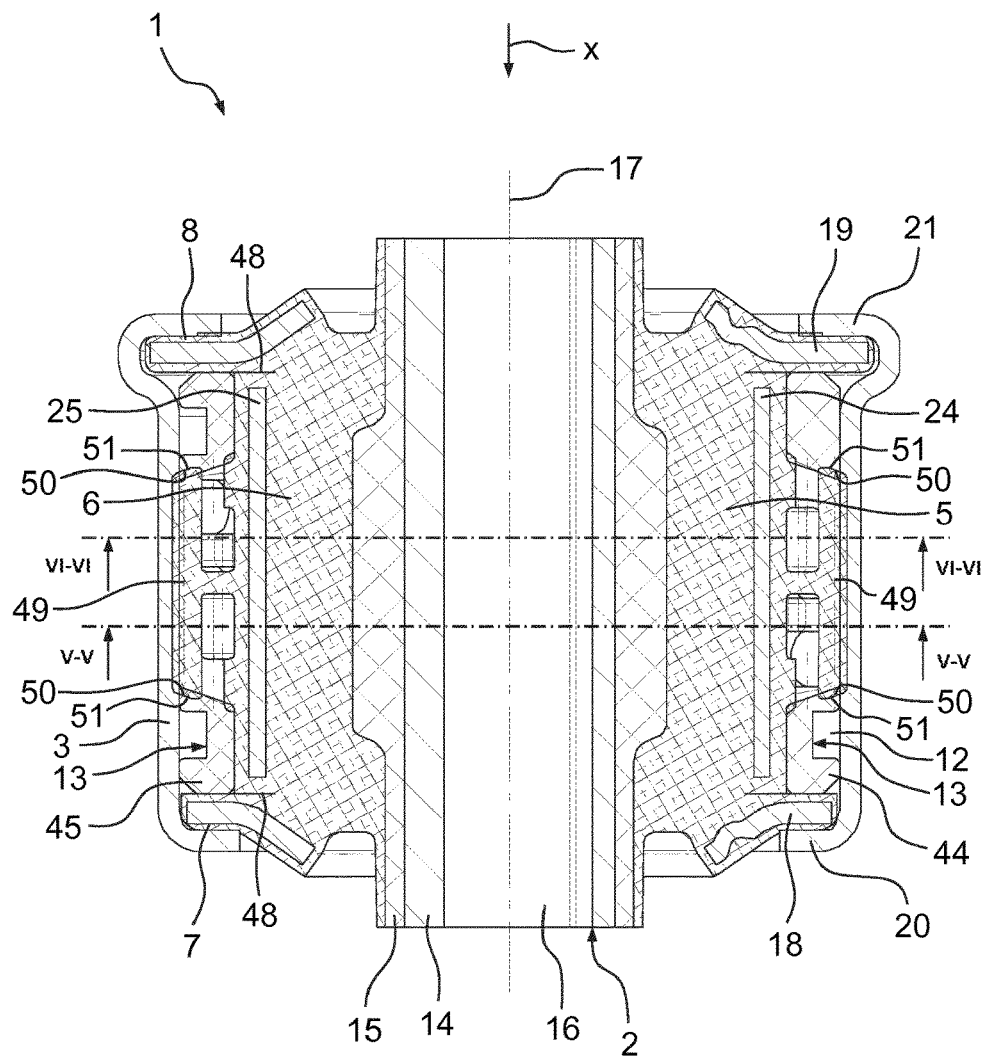
Figure 5:
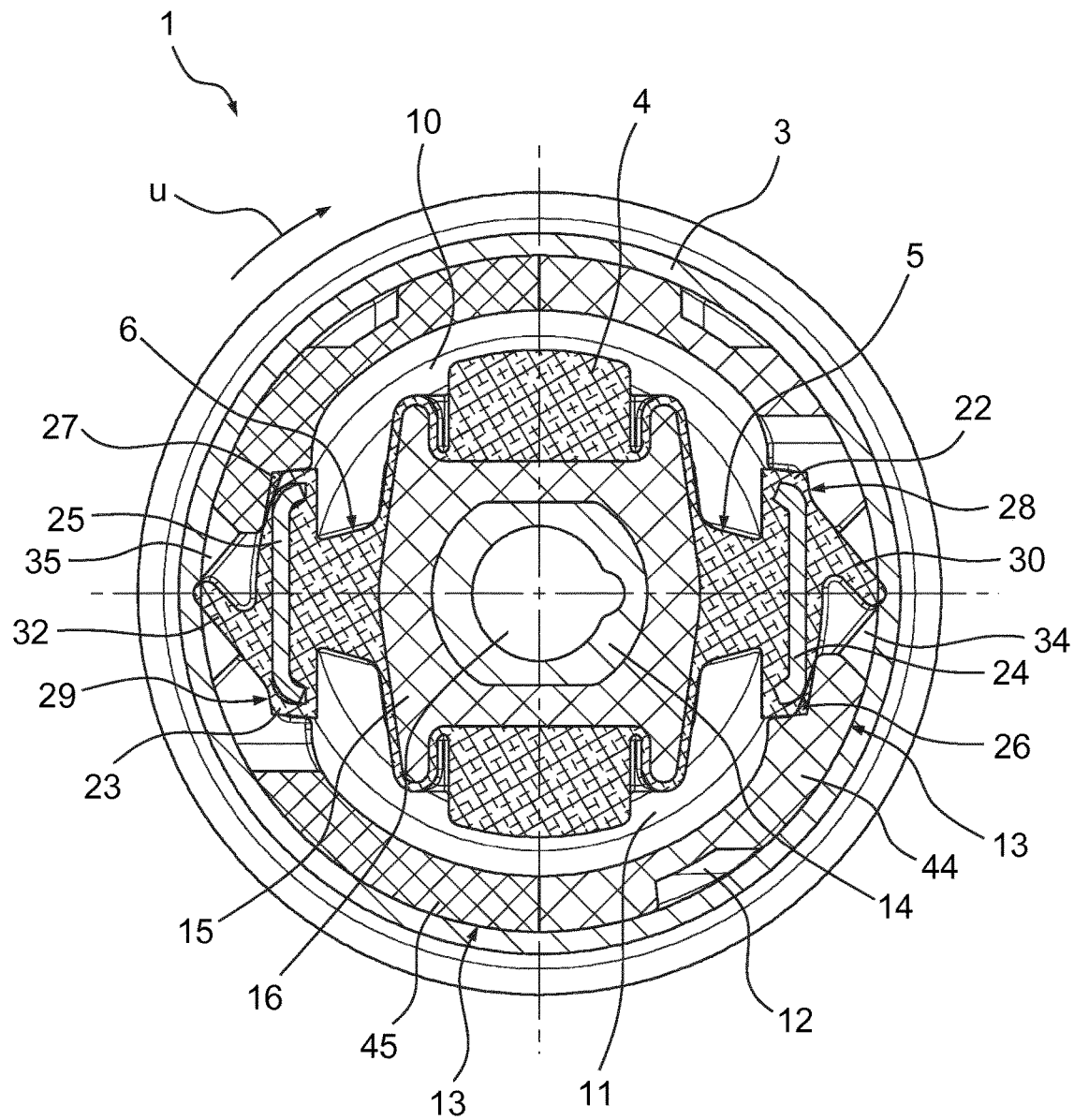
Figure 6:
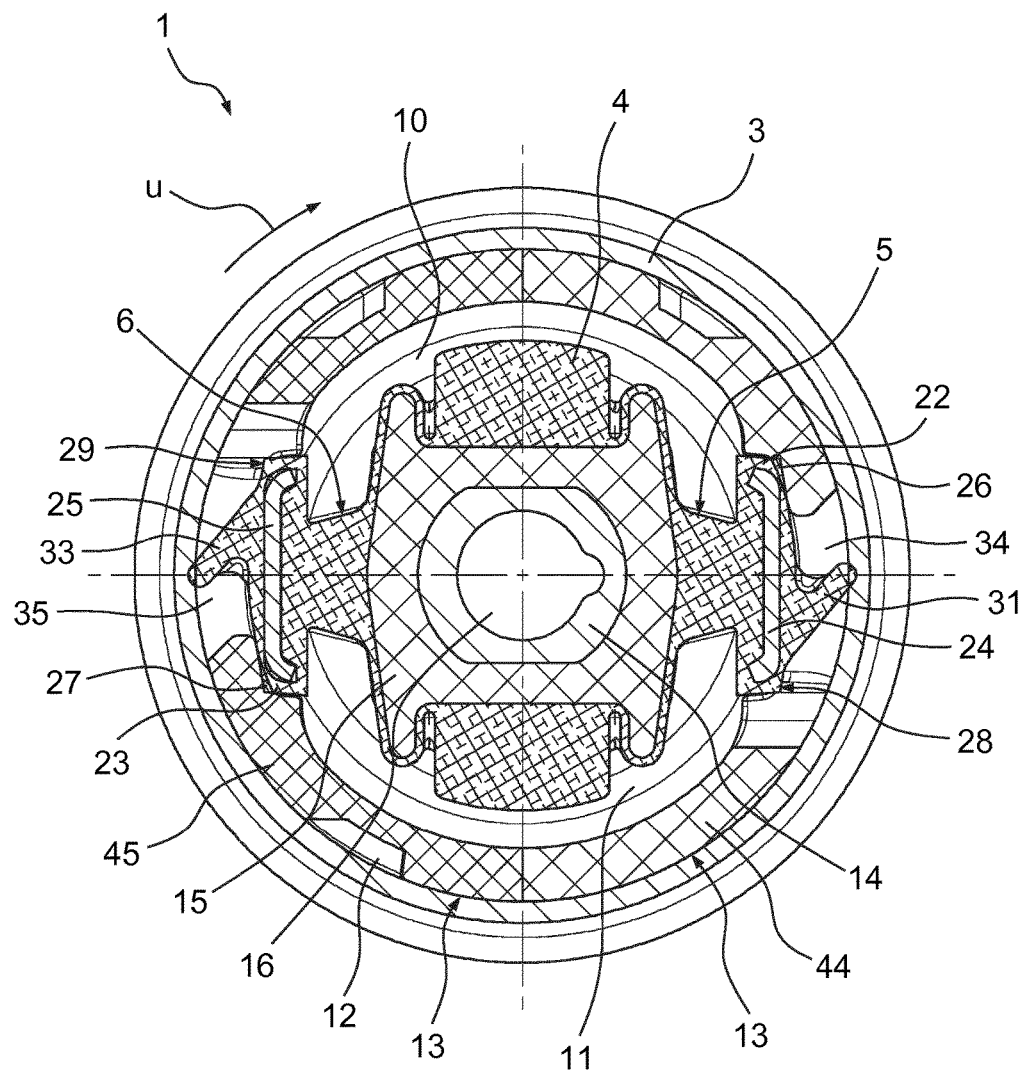

Different views of an elastomeric journal bearing 1 according to an embodiment of the invention are illustrated in FIGS. 1 to 6. The journal bearing 1 includes an inner part 2 extending in an axial direction x, an outer sleeve 3 surrounding the inner part 2, and an elastomeric bearing body 4 which is arranged between the inner part 2 and the outer sleeve 3 and connected to the inner part 2, the elastomeric bearing body 4 surrounding the inner part 2 and having at least two radially extending webs 5 and 6 which are offset relative to one another in the circumferential direction u, and two annular walls 7 and 8 which are offset relative to one another in the axial direction x, wherein the webs 5 and 6 extend axially between the walls 7, 8, and at least two chambers 10 and 11 which are filled with a liquid 9 and are mutually separated in the circumferential direction u by the webs 5 and 6, and which are fluidically connected with one another by a channel 12, and a carrier element 13 disposed between the elastomeric bearing body 4 and the outer sleeve 5 and surrounding the bearing body. 4 The channel 12 is formed as a groove introduced in the outer periphery of the carrier element 13 and is delimited in the radial direction by the outer sleeve 3. The channel is connected with the chambers 10 and 11 by discharge holes provided in the carrier element. The carrier element 13 thus forms a channel support.

The inner member 2 includes an inner metal body 14 which is surrounded by a plastic body 15 which is materially connected to the elastomeric bearing body. 4 Furthermore, a mounting hole 16 which is used, in particular, for affixing the journal bearing 1 to another component extends through the metal body 14 in the axial direction x. A longitudinal center axis of the journal bearing 1 extending in the axial direction x is marked with the reference numeral 17.

The annular walls 7 and 8 each include an annular reinforcing member 18 and 19, respectively, wherein the reinforcing member 18 is embedded in the wall 7 and the reinforcing member 19 is embedded in the wall 8. The carrier element 13 is arranged in the axial direction x between the annular walls 7 and 8 and axially bears against the same. The carrier element 13 thus applies a radial prestress to the elastomeric bearing body 4. Furthermore, the elastomeric bearing body 4 is disposed in the axial direction x between the radially inwardly extending and/or folded-over axial end regions 20 and 21 of the outer sleeve 3 and axially bears against the same. Axial prestress is hereby applied to the elastomeric bearing body 4 by the axial end portions 20 and 21.

The radially outer web ends 22 and 23 of the webs 5 and 6 are plate-shaped and protrude in the circumferential direction on both sides from the respective web. Furthermore, the radially outer web ends 22 and 23 each have a reinforcing plate 24 and 25, wherein the reinforcing plate 24 is embedded in the radially outer web end 22 of the web 5 and the reinforcing plate 25 is embedded in the radially outer web end 23 of the web. 6 The reinforcing plates 24 and 25 are spaced apart with respect to one another in the circumferential direction u and are not directly connected with one another.

Recesses 26 and 27 which are continuous in the axial direction x are provided on the inner circumference of the carrier element 13, with the radially outer web ends 22 and 23 of the webs 5 and 6 accommodated in the recesses. The web 5 hereby rests with its radially outer web end 22 in the recess 26, and the web 6 rests with its radially outer web end 23 in the recess 27.

The webs 5 and 6 each have at their radially outer web ends 22 and 23 a radial end face 28 or 29, wherein the radial end face 28 is associated with the web 5 and the radial end face 29 is associated with the web 6. Furthermore, the webs 5 and 6 have at their radial end faces 28 and 29 overflow lips 30, 31, 32 and 33 that radially extend through openings 34 and 35 provided in the carrier element 13 and bear against the inner circumference of the outer sleeve 3. The overflow lips 30 and 31 are associated with the web 5 and the overflow lips 32 and 33 are associated with the web 6. Furthermore, the opening 34 is provided in the recess 26 and the opening 35 is provided in the recess 27.

The overflow lips 30 to 33 are inclined with respect to the circumferential direction u and extend obliquely outwardly from the respective radial end face 28 or 29. In this case, each web 5 and 6 has two oppositely inclined overflow lips 30 and 31 or 32 and 33. The overflow lips 30 and 31 are arranged next to one another in the axial direction x and have each a first axial lip end 49 and a second axial lip end 50, wherein the first axial lip ends 49 of the two overflow lips 30 and 31 merge into one another. Furthermore, the overflow lips 30 and 31 are at their first axial lip ends 49 completely vulcanized to the web 5 in the radial direction, but are only partially vulcanized to the web 5 at their second axial lip ends 50, so that the second axial lip ends 50 are free at their radially outer ends. Additionally, the second axial lip ends 50 are inclined at their front faces and abut axial contact surfaces 51 of the carrier element which are correspondingly inclined. The overflow lips 32 and 33 are formed analogous to the overflow lips 30 and 31.

Figure 7:
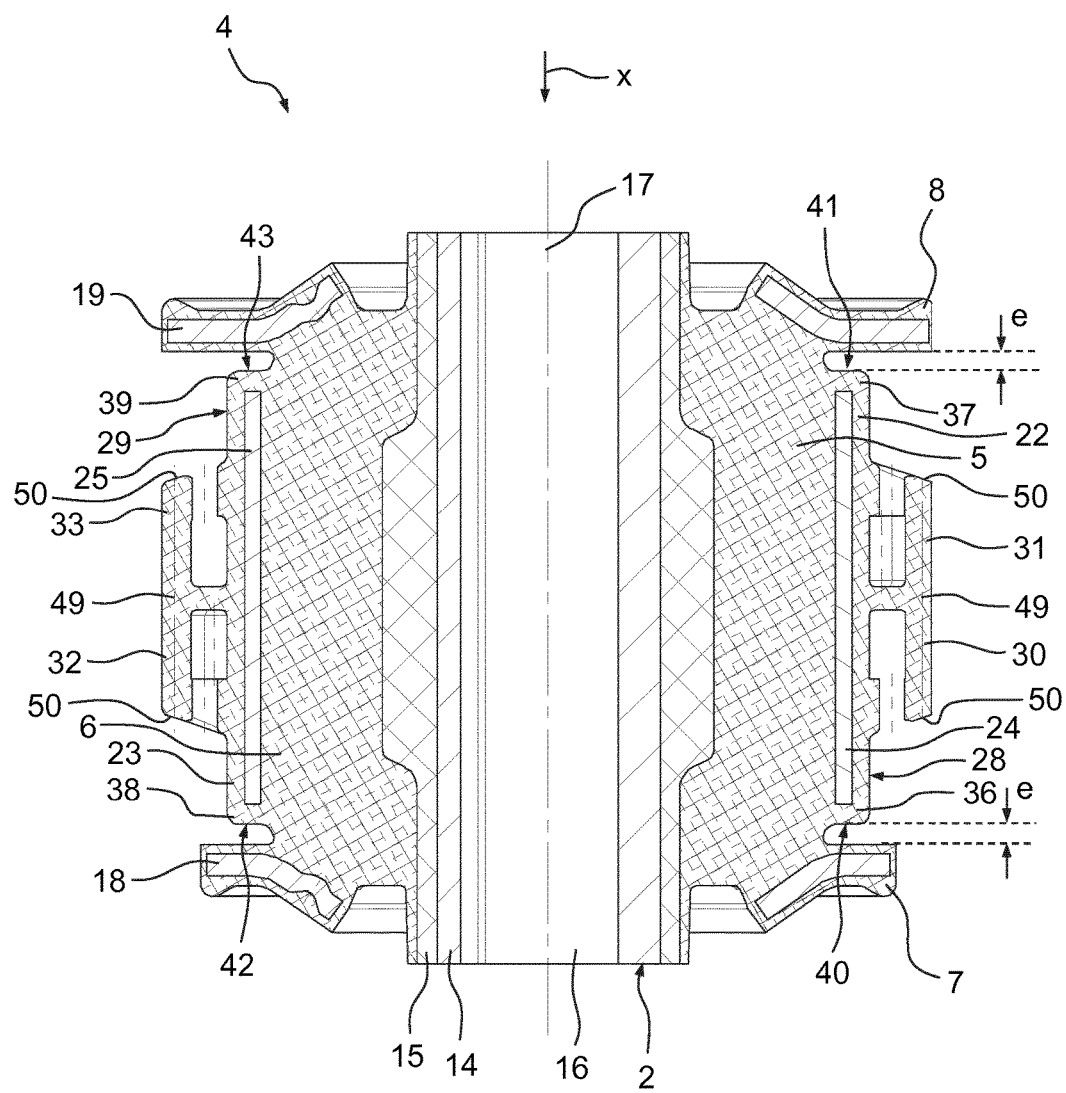

FIG. 7 shows a longitudinal section through the elastomeric bearing body 4 prior to its installation in the outer sleeve 3. As can be seen, the axial ends 36, 37, 38 and 39 of the webs 5 and 6 have axial end faces 40, 41, 42 and 43 in the region of the radially outer web ends 22 and 23, wherein the axial end faces 40 and 42 each have an axial spacing from the annular wall 7 and the axial end faces 41 and 43 each have an axial spacing from the annular wall 8. Thus, the axial end faces 40 and 42 each enclose a respective gap e with the annular wall 7 and the axial end faces 41 and 43 each enclose a respective gap e with the annular wall 8. The axial ends 36 and 37 and the axial end faces 40 and 41 are hereby associated with the web 5, whereas the axial ends 38 and 39 and the axial end faces 42 and 43 are associated with the web 6. The gaps e are closed during installation of the journal bearing by applying an axial pressure to the elastomeric bearing body 4 so that, in the assembled state of the journal bearing 1, the axial end faces 40 and 42 axially bear against the annular wall 7 and the axial end faces 41 and 43 axially bear against the annular wall. 8 The closed gaps e are shown schematically in FIGS. 1 and 4 and designated with the reference numeral 48.

Figure 8:
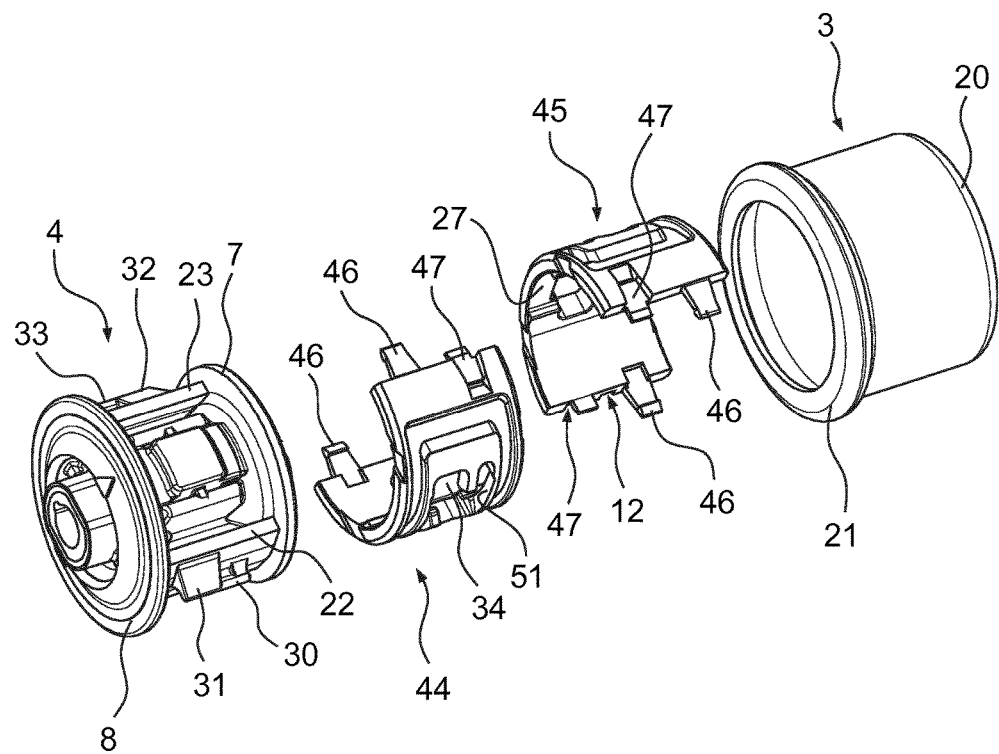

FIG. 8 shows an exploded view of the journal bearing 1, wherein it is evident that the carrier element 13 is composed of two half-shells 44 and 45 which are connected to each other during assembly of the journal bearing 1 by a snap connection and form in the interconnected state the carrier element 13. For this purpose, each of the half-shells has two snap-hooks 46 and two engagement contours 47, in which the snap hooks of the respective other half-shell can positively lock and are snapped in the assembled state of the carrier element 13.

LIST OF REFERENCE SYMBOLS 1 journal bearing
2 inner part
3 outer sleeve
4 elastomeric bearing body
5 web
6 web
7 annular wall
8 annular wall
9 liquid
10 chamber
11 chamber
12 channel
13 carrier element
14 metal body of the inner part
15 plastic body of the inner part
16 mounting hole of the inner part
17 longitudinal center axis
18 annular reinforcing member
19 annular reinforcing member
20 axial end region of the outer sleeve
21 axial end region of the outer sleeve
22 radially outer web end
23 radially outer web end
24 reinforcing plate
25 reinforcing plate
26 recess in carrier element
27 recess in carrier element
28 radial end face of the web
29 radial end face of the web
30 overflow lip
31 overflow lip
32 overflow lip
33 overflow lip
34 opening in carrier element
35 opening in carrier element
36 axial end of the web
37 axial end of the web
38 axial end of the web
39 axial end of the web
40 axial end face of the web
41 axial end face of the web
42 axial end face of the web
43 axial end face of the web
44 half-shell of the carrier element
45 half-shell of the carrier element
46 snap hook
47 engagement contour
48 closed gap
49 axial lip end
50 axial lip end
51 axial contact surface
x axial direction
u circumferential direction
e gap/spacing

The invention claimed is:
1. An elastomeric journal bearing comprising:
an inner part (2) extending in an axial direction (x),
an outer sleeve (3) surrounding the inner part (2), and an elastomeric bearing body (4) arranged between the inner part (2) and the outer sleeve (3) and connected with the inner part (2), the elastomeric bearing body (4) comprising at least two radially extending webs (5, 6) which are offset relative to one another in a circumferential direction (u) and two annular walls (7, 8) which are offset relative to one another in the axial direction (x), with the webs (5, 6) extending axially between the walls (7, 8), and at least two separate chambers (10, 11) which are filled with liquid (9) and are separated in the circumferential direction (u) by the webs (5, 6) and are fluidically connected to one another by at least one channel (12), wherein axial ends (36, 37, 38, 39) of the webs (5,6) comprise at least in a region of radially outer web ends (22, 23) of axial end faces (40, 41, 42, 43) which bear against the annular walls (7, 8), further comprising a carrier element (13) which is arranged between the bearing body (4) and the outer sleeve (3) and surrounds the bearing body (4), by way of which the carrier element (13) the elastomeric bearing body (4) is radially biased, wherein the radially outer web ends (22, 23) of the webs (5, 6) bear against the carrier element (13).

2. The elastomeric journal bearing according to claim 1, wherein the axial end faces (40, 41, 42, 43) of the webs (5, 6) are not materially connected with the walls (7, 8).

3. The elastomeric journal bearing according to claim 1, wherein the axial end faces (40, 41, 42, 43) of the webs (5, 6) are movable relative to the walls (7, 8).

4. The elastomeric journal bearing according to claim 1, wherein the channel (12) is provided in the carrier element (13).

5. The elastomeric journal bearing according to claim 1, wherein the carrier element (13) is composed of two half-shells (44, 45) that are interconnected by a snap connection.

6. The elastomeric journal bearing according to claim 1, wherein axially continuous recesses (26, 27) are provided on the inner circumference of the carrier element (13), with the radially outer web ends (22, 23) of the webs (5, 6) being inserted in the recesses (26, 27).

7. The elastomeric journal bearing according to claim 1, wherein the webs (5, 6) comprise overflow lips (30, 31; 32, 33) at their radially outer web ends (22, 23), with the webs (5, 6) bearing against the outer sleeve (3) or the carrier element (13) with the overflow lips (30, 31; 32, 33).

8. The elastomeric journal bearing according to claim 7, wherein the overflow lips (30, 31; 32, 33) are inclined relative to the radial direction and the webs (5, 6) each have two of the overflow lips (30, 31; 32, 33) which are inclined to one another in opposite directions.

9. The elastomeric journal bearing according to claim 7, wherein the overflow lips (30, 31; 32, 33) extend in the radial direction through the openings (34, 35) provided in the carrier element (13).

10. A method for producing an elastomeric journal bearing comprising: an inner part (2) extending in an axial direction (x); an outer sleeve (3) surrounding the inner part (2); and an elastomeric bearing body (4) arranged between the inner part (2) and the outer sleeve (3) connected with the inner part (2); the elastomeric bearing body (4) comprising at least two radially extending webs (5, 6) which are offset relative to one another in a circumferential direction (u) and two annular walls (7, 8) which are offset relative to one another in the axial direction (x), with the webs (5, 6) extending axially between the walls (7, 8), and at least two separate chambers (10, 11) which are filled with liquid (9) and are separated in the circumferential direction (u) by the webs (5, 6) and are fluidically connected to one another by at least one channel (12); wherein axial ends (36, 37, 38, 39) of the webs (5,6) comprise at least in a region of radially outer web ends (22, 23) of axial end faces (40, 41, 42, 43) which bear against the annular walls (7, 8); the elastomeric journal bearing further comprising a carrier element (13) which is arranged between the bearing body (4) and the outer sleeve (3) and surrounds the bearing body (4), by way of which the carrier element (13) the elastomeric bearing body (4) is radially biased, wherein the radially outer web ends (22, 23) of the webs (5, 6) bear against the carrier element (13), the method comprising the steps of:

producing the elastomeric bearing body (4), connecting the elastomeric bearing body (4) with the inner part (2), whereafter inserting the elastomeric bearing body (4) connected with the inner part (2) into the outer sleeve (3) while immersed in the liquid (9) and subsequently secured in the outer sleeve (3), producing the elastomeric bearing body (4) such that the axial end faces (40, 41, 42, 43) of the webs (5, 6) enclose axial gaps (e) with the walls (7, 8), wherein the elastomeric bearing body (4) connected with the inner part (2) is inserted in the outer sleeve (3) while applying axial pressure to the elastomeric bearing body (4) such that the axial gaps (e) are closed and the axial end faces (40, 41, 42, 43) of the webs (5, 6) are placed in contact with the walls (7, 8).

11. The method according to claim 10, further comprising the step of mounting of the carrier element (13) on the elastomeric bearing body (4) in such a way that the elastomeric bearing body (4) is surrounded by the carrier element (13) and is placed under radial prestress, wherein the elastomeric bearing body (4) connected with the inner part (2) is inserted into the outer sleeve (3) together with the carrier element (13) surrounding the elastomeric bearing body (4), so that the carrier element (13) is arranged between the elastomeric bearing body (4) and the outer sleeve (3).

* * * * *